United States Patent [19]

Dréano

[11] Patent Number: 4,505,192

[45] Date of Patent: Mar. 19, 1985

[54] INSTALLATION FOR COOKING, DEFROSTING AND COOLING OF FOOD PRODUCTS AND IN PARTICULAR HAMS

[76] Inventor: Claude Dréano, Rte. de Perhan, 56490 Guilliers, France

[21] Appl. No.: 389,445

[22] Filed: Jun. 17, 1982

[30] Foreign Application Priority Data

Jul. 8, 1981 [FR] France .................. 81 13922

[51] Int. Cl.³ .................................... A47J 27/20
[52] U.S. Cl. ............................ 99/330; 99/355; 99/367; 99/448; 426/506
[58] Field of Search .............. 99/325, 330, 352, 355, 99/403, 416, 359, 367, 368, 370, 448; 165/61; 426/506, 509, 520, 523, 524

[56] References Cited

U.S. PATENT DOCUMENTS

| | | | |
|---|---|---|---|
| 1,485,133 | 2/1924 | White | 99/330 X |
| 1,927,043 | 9/1933 | Mullen | 99/330 |
| 1,986,115 | 1/1935 | Offenhauser | 99/367 X |
| 3,796,144 | 3/1974 | Foldenauer | 99/355 |
| 4,058,635 | 11/1977 | Durth | 426/509 |
| 4,173,993 | 11/1979 | Skala | 165/48 R |
| 4,270,598 | 6/1981 | Britton | 99/355 X |

FOREIGN PATENT DOCUMENTS

| | | |
|---|---|---|
| 209427 | 5/1909 | Fed. Rep. of Germany . |
| 2257235 | 8/1975 | France . |
| 2288481 | 5/1976 | France . |
| 2296393 | 7/1976 | France . |
| 2424706 | 11/1979 | France . |
| 1059841 | 2/1967 | United Kingdom . |

Primary Examiner—Billy J. Wilhite
Attorney, Agent, or Firm—Laff, Whitesel, Conte & Saret

[57] ABSTRACT

In the cooking process, in particular that of hams, the heat carrying fluid is put in contact with moulds (15) for a relatively short period of time, then removed for a relatively long period of time. This cycle is reproduced a certain number of times until the desired temperature is attained at the heart of the product. The cooking installation to carry out the process comprises a number of thermally isolated enclosures (1.1 to 1.n) containing stack of filled ham moulds (15), a heat carrying fluid heating station (2), a network of conducts (5, 10) between the enclosures (1.1 to 1.n) and the heating station (2), pumping apparatus (9, 14) and valves (8.1 to 8.n and 13.1 to 13.n) installed on the network or conducts (5, 10) to selectively fill one enclosure with heat carrying fluid from the heating station (2) or empty an enclosure into the heating station (2), and control means (4) to control the pumping apparatus (9, 14) and the valves (8.1 to 8.n and 13.1 to 13.n).

12 Claims, 3 Drawing Figures

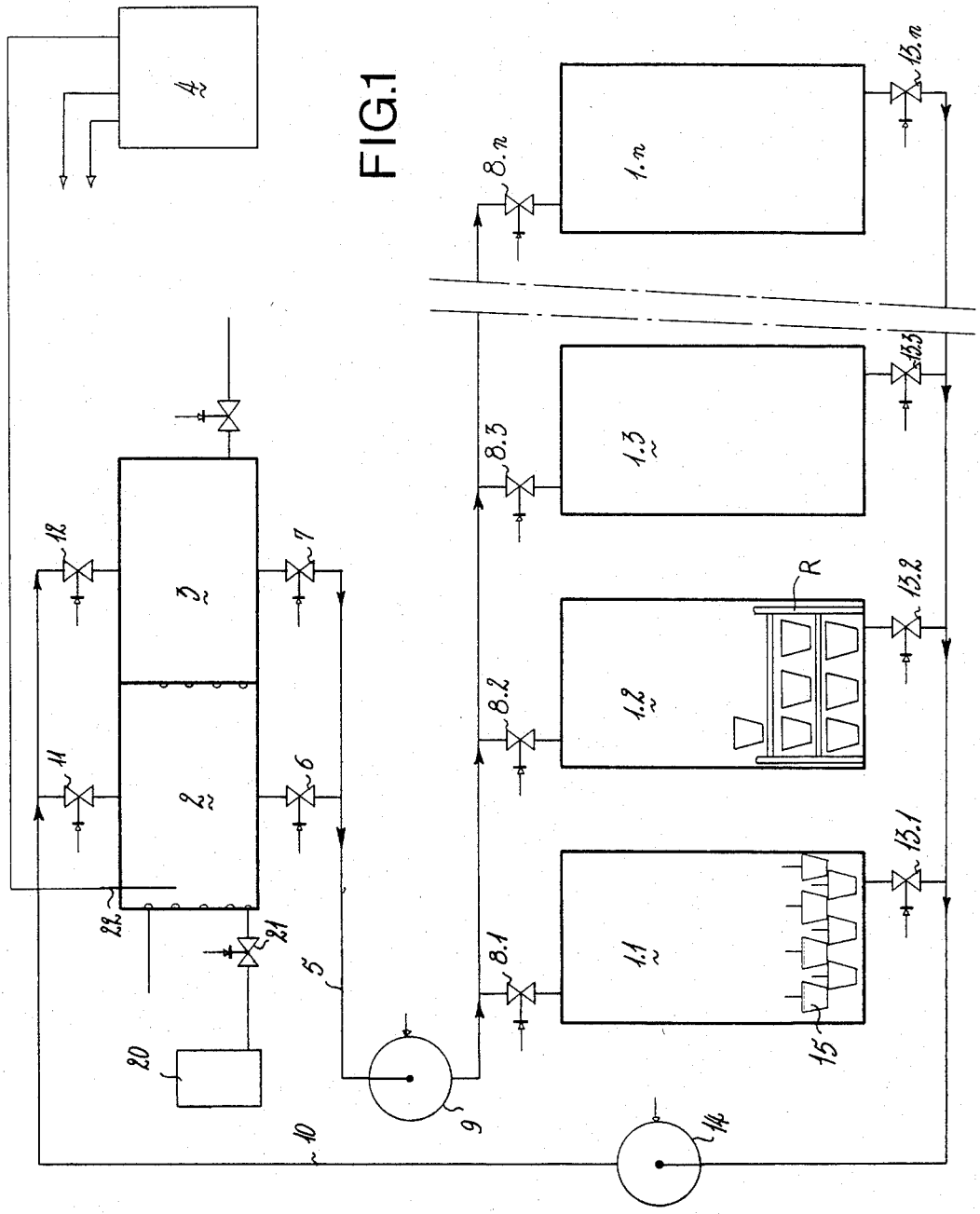

INSTALLATION FOR COOKING, DEFROSTING AND COOLING OF FOOD PRODUCTS AND IN PARTICULAR HAMS

The present invention is with regards to a process and installation for cooking, defrosting and cooling of food products and in particular hams.

In the description that follows, we will consider in particular the cooking and cooling of hams, but we must understand that the process of the invention can have other applications, in particular in a salting house.

Actually, the cooking of hams is carried out in enclosures filled with water or vapor. Within the enclosures, the hams are either in moulds stacked one on top of another, either wrapped in cloths or rags and placed in layers separated by racks. The moulds are generally made of cast aluminum.

In the relatively large salting firms, a number of enclosures are necessary to cook the daily production of hams. The hams in their moulds or rags are then stacked in the enclosures each night, then the enclosures are filled with water and cooking is carried out over a period of sixteen hours in accordance with a preestablished temperature program. In the morning, the hot water in the enclosures is emptied into the drain, which represents a relatively large energy loss. In other respects, the cooling water is obviously greasy, which tends to clog the drain.

In another connection, once the hams are cooked, we let them cool naturally before they are stocked in a cool room. The natural cooling, even in a well aerated room, requires a time of 12 to 24 hours which translates into an important occupation of the grounds. A reduction in the required cooling time has been attempted by sprinkling the hams with cold water however, they are washed out by this process.

A purpose of the present invention consists in foreseeing a process and a cooking installation that will allow a reduction of wasted water after cooking.

Another purpose of the present invention consists in foreseeing a process and installation allowing an improvement in the temperature rise curve for hams.

Another purpose of the present invention consists in foreseeing a process and cooking installation which can equally well be used for cooling hams.

In accordance with a characteristic of the invention, a cooking process is foreseen in which the heat carring fluid is placed in contact with the moulds containing the hams or the racks separating the layers of wrapped hams during a relatively short period of time, then withdrawn for a relatively long period of time, this cycle being repeated a certain number of times until the desired temperature is achieved at the core of the hams.

In accordance with the another characteristic, the temperature of the heat carrying fluid introduced is higher by a few and up to twenty degrees more than the said desired temperature at the core of the hams, the period of time in which the heat carrying fluid remains in contact with the moulds or the racks is of the order of one quarter hour and the period of time in which the said fluid is removed is of the order of 3 to 4 hours.

In accordance with another characteristic of the invention, a cooking installation is foreseen comprising a number of thermally isolated enclosures containing stacks of filled ham moulds or wrapped hams separated by racks, a heat carrying fluid heating station, a network of conducts between the enclosures and the heatig station, pumping apparatus and valves installed on the network of conducts to selectively fill one enclosure with heat carrying fluid from the heating station or empty one enclosure into the heating station and control means to control the pumping apparatus and the valves.

In accordance with another characteristic, the said control means are controlled by a program established in relation to the masses of the hams spread in the enclosures.

In accordance with another characteristic, a cooling process is foreseen in which the heat carrying fluid is at a temperature definitely below that of the hams.

In accordance with another characteristic, an installation is foreseen in which the heating station is replaced by a cooling station.

In accordance with another characteristic a cooking installation associated to a cooling installation is foreseen.

The purposes, advantages and characteristics of the invention as well as others will appear more clearly upon reading the following description of realization examples, the same description being done in relation to the attached drawings, among which:

FIG. 1 is a drawing of the cooking and cooling installation according to the invention;

Figure 3:
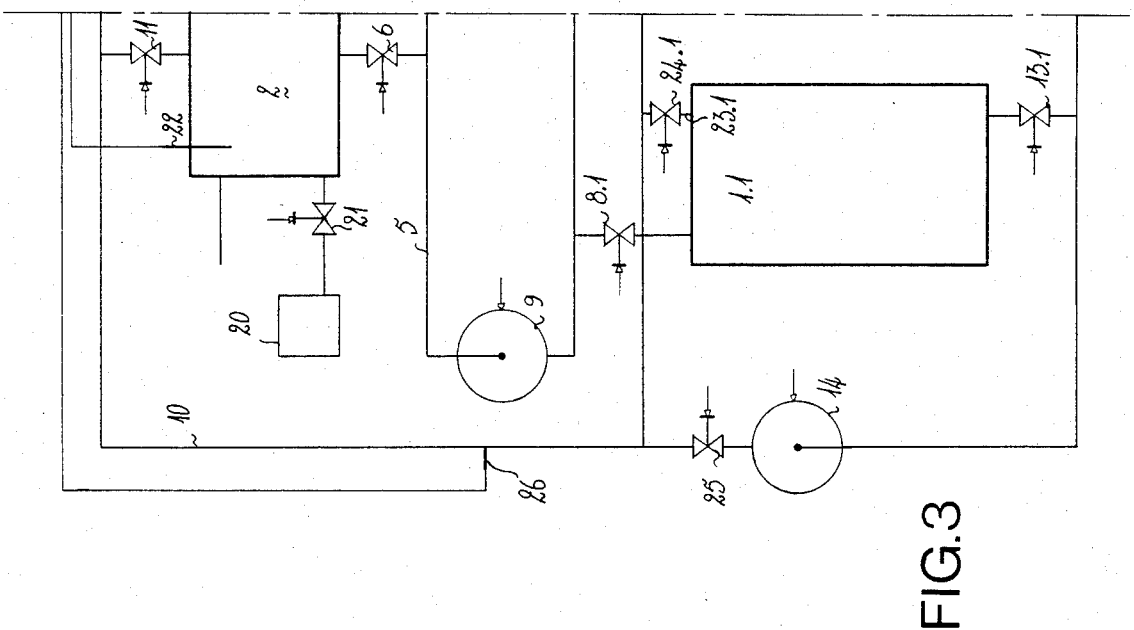
FIG. 3 is a drawing of one variation of the installation of FIG. 1.

The installation of FIG. 1 comprises a series of enclosures 1.1 to 1.n, a heating station 2, a cooling station 3, a control circuit 4 and a set of conducts, valves and pumps to be described in greater detail in the sequel.

One going conduct 5 is connected in parallel, on one hand to the stations 2 and 3 by output valves 6 and 7, and on the other hand to the enclosures 1.1 to 1.n by input valves 8.1 to 8.n. Furthermore, on conduct 5 a suction pump 9 draws the fluid coming out of valve 6 or 7 to force it into valves 8.1 to 8.n.

A return conduct 10 is connected in parallel, on one hand, to stations 2 and 3 by input valves 11 and 12, and on the other hand, to the enclosures 1.1 to 1.n by output valves 13.1 to 13.n. Furthermore, on conduct 10 a suction pump draws the fluid coming out of one of the valves 13.1 to 13.n to push it towards valves 11 and 12.

Enclosure 1.1 has one well insulated wall to limit the losses to the exterior. In the example, it contains a stack of moulds filled withhams. Likewise, enclosure 1.2 is drawn to show a rack "R" for supporting food products. Each mould is, for example, made of cast aluminum and covered with a lid 16 also made of cast aluminum. We know that a lot of ham moulds are already made of aluminum. However, in the process of the invention, the properties of this material are very interesting. In fact, it is a good heat conducting material. The moulds have a thickness of the order of 5 to 6 mm, such that considering the good specific heat of aluminum, they are capable of quickly accumulating a considerable amount of heat.

Figure 2:
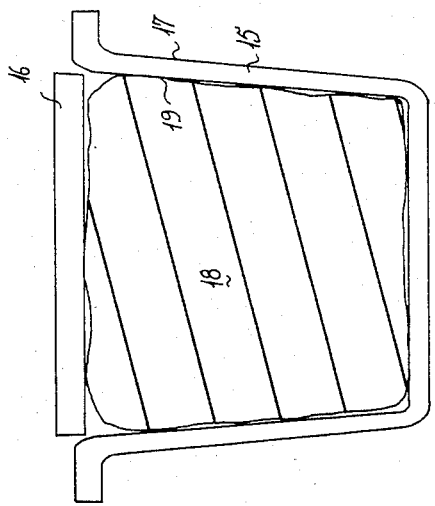
FIG. 2 is a sectional view illustrating the operation of the installation of FIG. 1.

Mould 15, which in the sequel is taken to include a lid 16, and shown sectionally in FIG. 2 quickly accumulates heat when its exterior surface 17 is in contact with hot water. However, the mass of the ham 18, inside the mould has a relatively low thermal conductivity coefficient such that the mould slowly releases heat to the ham through its internal surface 19. As mentioned above, according to the invention, in the process we introduce for example hot water at 80° C. in enclosure 1 and we leave the water in the enclosure for say 15 minutes. Before the end of the period, the mould 15 has reched the temperature of the water. Once water has been removed from the enclosure 1.1, mould 15, with its lid of course, loses practically no heat to the exterior by surface 17, however, will release heat to the ham. We then repeat the cycle a number of times until the temperature at the center of the ham reaches 67° C.

The heating station 2 is an enclosure of volume equal to at least that of an enclosure 1.1 to 1.n. It is heated from either a source of hot water or steam 20 whose output is connected by a valve 21 to a conventional heating coil which heats the walls of station 2. The heat exchanger which consists of the coil and the wall of station 2 is such that by opening valve 21, the temperature of the water inside 2 increases by about twenty degrees in two or three minutes. The station 2 has a heat sensor connected to one input of the control circuit 4, which comprises a regulation circuit closing valve 21 when the temperature inside 2 has attained a predetermined temperature, for example 80° C.

At the beginning of a cooking operation within the enclosure 1.1 to 1.n, circuit 4 opens valve 21. Then when the temperature of 80° C. is attained in 2, the circuit 4 closes valve 21, triggers the operation of pump 9, and opens valves 6 to 8.1. The hot water flows from 1 into 1.1, then circuit 4 stops pump 9 and closes valves 6 and 8.1. Fifteen minutes later, the control circuit 4 triggers pump 14 and opens valve 13.1 and 11. The slightly cooled water in 1.1 flows once again into 2 and circuit 4 stops pump 14 and closes valve 1.1 and 11. The circuit 4 opens once again valve 21 to reheat the water returned into 2.

Once again when the water in 2 has reached 80° C., circuit 4 closes valve 21, then triggers pump 9 and opens valves 6 and 8.2. The reheated water flows from 2 into enclosure 1.2 Circuit 4 then stops pump 9 and opens valves 6 and 8.2. After fifteen minutes it triggers pump 14 and opens valves 13.2 and 11. The water flows back from 1.2 into 2. The pump 14 and valves 13.2 and 11 are closed, valve 21 is reopened to reheat the water in 2.

Operations similar to those described alone allow, under the control of 4, to sequentially heat the following enclosures 1.3 to 1.n. If the time interval between the withdrawal of water from one enclosure and its reinsertion is four hours and if the hot water remains in one enclosure fifteen minutes, the number n of enclosures, while taking into account a delay of the order of two or three minutes for reheating the water in 2, can be equal to 12.

A first advantage is immediately apparent. With the amount of water necessary to heat an enclosure 1.7 to 1.12, supposing n=12, we have heated twelve enclosures. There is thus twelve times less water rejected.

A second advantage results from the fact that the initial water gradually accumulates proteins, nutrients, aromas, etc., to the point of becoming a genuine broth. It is true that, in the known cookings, the water also accumulates these products, but with the procedure of the invention, we use twelve times less water, the broth obtained is thus twelve times more concenrated. Thus the richness of the broth in protein and nutrients, etc. is known to improve the taste and nutritional valve. In order regards, this concentration in natural products avoids the necessity of adding additional products. The experiment has also shown that hams retain their pigmentation better.

A third advantage maintains that the water or the broth that comes in contact with the hams through openings or cracks between the mould and its lid washout less the ham because pure water is present only one twelth of the time or less. The experiment confirmed a generally better result. We have also observed a better consistency of slices.

Another advantage results from the lesser quantity of water that must be heated. In fact, even at the beginning of cooking, the water coming out of an enclosure that it has heated is not cold, it has suffered a drop in temperature of the order of 15° C. Thus before sending it to the next enclosure it is only necessary to increase its temperature by this amount. This is not the case with conventional independent vats.

Of course, after experimenting, we can determine, in a precise manner, the number of calories to be added at each cycle to an enclosure by taking into consideration the weight of each ham and the number of moulds that were introduced in the enclosure. It is thus possible to foresee a control circuit having a microprocessor in whose memory can be tabulated weight data and numbers of moulds to allow automatic control of the different parts of the heating cycle.

Another advantage results from the fact that a single temperature regulation is necessary to vat 2, the other enclosures 1.1 to 1.n not having any and thus being very simple. The cost of the installation is thus reduced.

In the installation shown in FIG. 3, which is a variation of that shown in FIG. 1, the overflow outputs 23.1 to 23.n are connected in parallel to the return conduct 10 downstream from the pump 14, but upstream from valve 11. In fact each parallel branch has a valve 24.1 to 24.n. Between the hookup point of the overflow outputs 23.1 to 23.n and conduct 10, on one hand, and pump 14, on the other hand, is set a valve 25. Furthermore, a temperature sensor is mounted on conduct 10.

The operation of the installation of FIG. 3 is such that at the beginning of the heat cycle of one enclosure, such as 1.1, valve 6 is open, the pump 9 operates, valve 8.1 is open, valve 24.1 is open, as is also valve 11. However, all the valves associated to enclosures 1.2 to 1.n are closed, as is valve 25. Thus, the hot fluid is sent from 2 into 1.1, where it cools while filling enclosure 1.1. Once it is filled, pump 9 continues its operation such that the water already cooled escapes through the overflow 23.1, valve 24.1, conduct 10 and valve 11 towards vat 2, where it is once again heated. Pump 9 continues to operate as long as the temperature sensor 26 indicates a temperature differential with that of sensor 22 of vat 2, taking into consideration the normal unavoidable losses. Thus, when pump 9 stops, we are guaranteed that the water temperature in enclosure 1.1 is equal to that of vat 2.

It is apparent that with the installation of FIG. 3, that at each filling of one enclosure, the temperature of the water or the broth is particularly well defined, which allows a precise evaluation of the duration of each cycle.

Of course, all the valves of the installations of FIGS. 1 and 3 are controlled by the control circuit 4.

I claim:

1. Apparatus for cooking, heating, defrosting or cooling food products through a transfer of heat via a heat carrying fluid means which is associated with containers for the food products, said apparatus comprising means for bringing the heat carrying fluid into contact with the food products and containers for said food products during a relatively short period of time, then removing said fluid for a relatively long period of time, means for repeating a cycle of so bringing and removing said heat carrying fluid a certain number of times until a desired temperature appears at the center of the food product, means for controlling the introduction temperature of the heat carrying fluid to be slightly higher for heating or slightly colder for cooling relative to said desired temperature at the center of the food products, a number of thermally isolated enclosures containing a plurality of filled containers, a fluid heating station, a network of conducts for said heat carrying fluid extending between the enclosures and the heating station, pumping means and valve means in the network of conducts to selectively fill one enclosure with heat carrying fluid from the heating station, or to empty one of said enclosures into the heating station and control means for controlling the pumping means and valve means.

2. An installation in accordance with claim 1, characterized in that the walls of the containers are relatively thick.

3. An installation in accordance with claim 1 or 2 characterized in that the said control means includes program controlled means operated responsive to a program established in relation to the masses of the food products dispersed in the enclosures.

4. An installation in accordance with claim 3, characterized in that each of the enclosures includes overflow outputs connected to a conduct via valve means for returning said fluid to the heating station.

5. An installation in accordance with claim 4, in which the food product is at least one ham and said apparatus includes means for the preparation of cooked hams, and an associated means for cooling said hams.

6. An installation in accordance with claim 3, in which the food product is at least one ham and said apparatus includes means for the preparation of cooked hams, and an associated means for cooling said hams.

7. An installation in accordance with one of the claims 1 or 2 characterized in that each of the enclosures includes overflow outputs connected to a conduct by valve means for returning said fluid to the heating station.

8. An installation in accordance with claim 7, in which the food product is at least one ham and said apparatus includes means for the preparation of cooked hams, and an associated means for cooling said hams.

9. An installation in accordance with one of the claims 1 or 2 in which the food product is at least one ham and said apparatus includes means for the preparation of cooked hams, and an associated means for cooling said hams.

10. The apparatus for cooking, heating, defrosting or cooling food products of claim 1 and a number of thermally isolated enclosures containing said food product supported by racks.

11. An installation in accordance with claim 10, characterized in that the walls of the containers and the racks are relatively thick.

12. Apparatus for cooking, heating, defrosting or cooling food products through a transfer of heat via a heat carrying fluid means which is associated with containers for the food products, said apparatus comprising means for bringing the heat carrying fluid into contact with the food products and containers for said food products during a relatively short period of time, then removing said fluid for a relatively long period of time, means for repeating a cycle of so bringing and removing said heat carrying fluid a certain number of times until a desired temperature appears at the center of the food product, means for controlling the introduction temperature of the heat carrying fluid to be slightly higher for heating or slightly colder for cooling relative to said desired temperature at the center of the food products, a number of thermally isolated enclosures containing a plurality of filled containers, a fluid cooling station, a network of conducts for said heat carrying fluid extending between the enclosures and the cooling station, pumping means and valve means installed in the network of conducts to selectively fill one enclosure with heat carrying fluid from the heating station or to empty one of said enclosures into the heating station, and control means for controlling the pumping means and valve means.

* * * * *